United States Patent [19]
Bubien, Jr. et al.

[11] Patent Number: 5,638,433
[45] Date of Patent: Jun. 10, 1997

[54] BEST RATE TELECOMMUNICATION ACCESS CODE AND DATA TRANSCEIVER/ FACILITATOR (BRTF)

[75] Inventors: Walter J. Bubien, Jr., Prescott, Ariz.; Donald B. Learish, Roselle Park, N.J.

[73] Assignee: Best Rate, Inc., Roselle Park, N.J.

[21] Appl. No.: 439,864

[22] Filed: Aug. 1, 1995

Related U.S. Application Data

[63] Continuation-in-part of Ser. No. 154,061, Nov. 18, 1993, abandoned.

[51] Int. Cl.$^6$ .................................................. H04M 1/26
[52] U.S. Cl. ............................................... 379/130; 379/114
[58] Field of Search ..................................... 379/112, 113, 379/114, 115, 121, 133, 134, 140

[56] References Cited

U.S. PATENT DOCUMENTS

| | | | |
|---|---|---|---|
| 4,585,904 | 4/1986 | Mincone et al. | 379/131 |
| 4,751,728 | 6/1988 | Treat | 379/140 |
| 4,813,065 | 3/1989 | Segala | 379/112 |
| 5,400,395 | 3/1995 | Berenato | 379/114 |
| 5,425,085 | 6/1995 | Weinberger et al. | 379/112 |
| 5,473,630 | 12/1995 | Penzias et al. | 379/115 |

*Primary Examiner*—Krista M. Zele
*Assistant Examiner*—Daniel S. Hunter

[57] ABSTRACT

An automated transparent programmable telecommunication access call facilitator and dialing memory device for use by connection to a consumer telephone, fax or modem system which electronically, via outside data input, stores a combination of access codes, sequence of numbers and determined data transmission to facilitate user subscribership interconnected grouped discount least cost routing call completion that has been predetermined and automatically updated to offer subscribers the optimum quality and realized group discount cost for the service that is provided through the invention. When a call is initiated, the device uses the consumer dialed number transmitted from the telephone, fax or modem system to retrieve from the memory bank the appropriate one or more choices for use of access code, sequence of numbers and determined data transmission to facilitate user subscribership interconnected grouped discount least cost routing call completion in conjunction with the consumer dialed number and transmits both over the telephone line so that the subscribers call is automatically connected to the subscribers calling destination via the telecommunication company or choice for connection as determined by the provided service and as facilitated by the invention. This least cost routing device functions in a hands free and transparent manner with no effort or choice for call routing decisions having to be made on the part of the user of the invention.

21 Claims, 2 Drawing Sheets

BRTF
BEST RATE TELECOMMUNICATION ACCESS CODE AND DATA TRANSCEIVER FACILITATOR

BEST RATE TELECOMMUNICATION ACCESS CODE AND DATA TRANSCEIVER/FACILITATOR (BRTF)

BACKGROUND OF THE INVENTION

This a continuation in part of application Ser. No. 08/154,061 filed Nov. 18, 1993, now anbandoned.

1. Field of the Invention

This invention relates generally to automatic selection of telecommunication access codes (TACs) and more particularly to automatic selection of sequences of numbers and data to obtain the "best rate" and quality of service available for a user. TAG, sequences of numbers and data selection is enabled when a user creates an off-hook condition. The off-hook condition can be created by telephone, fax or modem. The dialed number initiates a query of solid state electronic memory banks which contain TACs, sequences of numbers, data, domestic and international area codes and time of day or year. After the invention's choice for use of the appropriate selection of the TAC, sequences of numbers and data is complete, the invention's choice for use of TAG, sequences of numbers and data and input number are automatically dialed and the user is connected with their desired destination.

2. Description of the Related Art

The related art, as exemplified in U.S. Pat. Nos. 3,792,203, 3,860,765, 4,862,498, 4,503,288, 4,751,728, 4,585,904 and 4,941,172 provide for telephone number generation and automatic re-dial memory and data downloading capabilities through the effort, choice and selection of the user for telephone dialing devices. These devices do not relate to or involve the variable automatic selection or automatic updating of telecommunication access codes (TACs), and more specifically automatic selection and sequencing of additional numbers and data to accomplish least cost routing as determined by the service offered through the invention, without any intervention, thought for selection, or effort on the part of the caller as a user of the current invention. None of the above listed patents are seen to disclose the specific arrangement of concepts disclosed by the present invention.

SUMMARY OF THE INVENTION

The invention herein disclosed comprises a small Central Processing Unit (CPU) that recognizes a caller's dialed number and then interrogates a solid state memory device. The solid state memory device stores a set of TACs, sequences of numbers and data that enable the caller to automatically complete their call or data transmission. The TACs, sequences of numbers and data are chosen so as to minimize the cost of the call. This invention determines the appropriate use of a TAC, sequences of numbers and data and completes the call without any added intervention or extra effort on the part of the caller. This invention also provides for the automatic updating of the memory which stores the TACs, sequences of numbers and data, without any added intervention, thought for choice or extra effort on the part of the caller. The device of the present invention communicates, through interrogation and interaction, with the Data Transmission Center (DTC). The DTC, of the provider, previously determines for use the optimum TACs, sequences of numbers and data for the consumer by researching and analyzing data or capabilities from a plurality of telecommunication carriers or possible path connections. The DTC is a proprietary communication device which uses standard forms of modem data transmission over telephone lines, with said lines being maintained by subscribers for use of the invention to accomplish data updating between the BRTF and DTC.

Accordingly, one of the objects of the present invention is to provide a device that automatically selects optimum TACs, sequences of numbers and data.

Another object of the present invention is to provide for automatically combining a choice of TAC, sequences of numbers and data with the caller initiated dialing sequence for completion of the call, without any added intervention, thought for choice or extra effort on the part of the caller.

Another object of the present invention is to provide a device which automatically dials the device's chosen selection(s) of a TAG, sequences of numbers and data and a dialed number, without any added intervention, thought for choice or extra effort on the part of the caller.

It is still another object of the present invention to provide automatic dialing and connection to the DTC during a specific time interval of varying predetermined increments, for automatically updating the internal memory which stores the TACs, sequences of numbers and data and associated data, without any added intervention, thought for choice or extra effort on the part of the caller.

Yet another object of the present invention is to provide a random access memory for storing TACs, sequences of numbers and data with their associated calling destination telephone area codes and times of day.

Another object of the present invention is to allow for automatically determining and directing of an incoming voice or fax/modem call to be passed through the device to be received by the telephone or fax/modem connected to the device.

A still further object of the present invention is to provide a Data Receiver Decoder (DRD modem) which interprets the data retrieved from the DTC so that it may be input into the memory unit of the present invention.

With these and other objects in view which will more readily appear as the nature of the invention is better understood, the invention consists in the novel combination and assembly of parts hereinafter more fully described, illustrated and claimed with reference being made to the attached drawings.

DESCRIPTION OF THE PREFERRED EMBODIMENT

Figure 1:
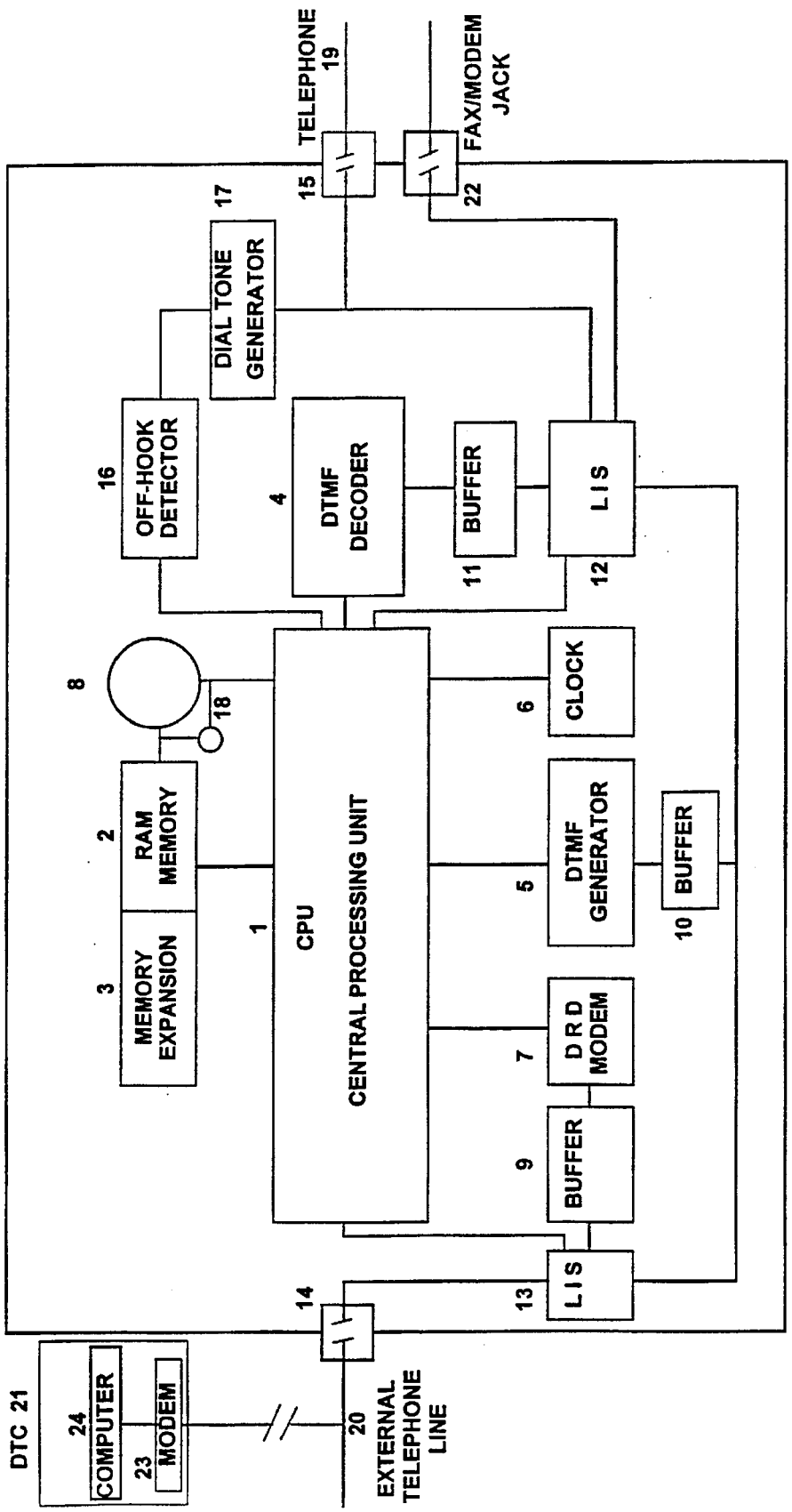
FIG. 1 is the block diagram of the major components of the invention showing their interrelationship and function.
Figure 2:
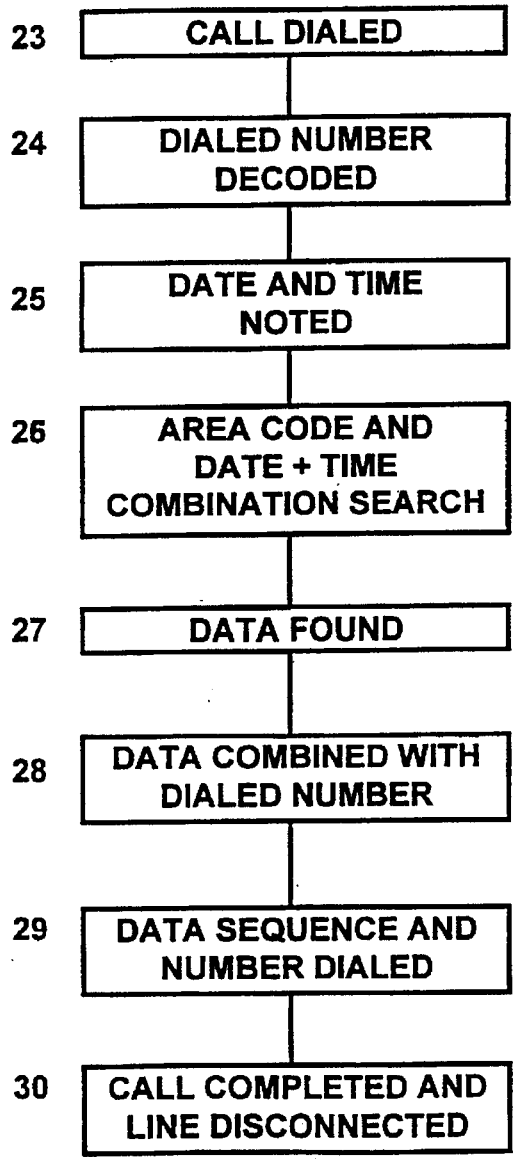
FIG. 2 is a flow diagram illustrating an exemplary use of the present invention.

Referring to FIGS. 1 and 2, a standard telephone, fax, computer modem or other telephone dialing device 19 is shown connected to the Best Rate Telecommunications Access Code and Data Transceiver/Facilitator (BRTF) 30 via a standard RJ-11 modular phone jack 15 or fax/modem modular phone jack 22.

An externally programmable, telecommunications access code (TAC), sequence of numbers in conjunction with optional data transmission, and data determining and dialing memory device for use by path connection to and from a consumer's telephone dialing device electronically, via outside data input, stores telecommunication access codes, and sequence of numbers and data that have been predetermined to offer subscribers the "best rate" or least cost of service. When a call is initiated, the device uses the consumer's dialed number, transmitted from the consumer's telephone dialing device to retrieve as determined by the (BRTF) 30 choice for use of telecommunication access codes, sequence of numbers and data transmission from memory storage with said (BRTF) 30 selected choice of access codes, sequence of numbers and data being appended to the consumer dialed number. The inventions choice of TAC, sequence of numbers and data being selected for use by all BRTF users as subscribers for use of the service from area to area as a group allows for billing accountability which offers substantial volume discounts to be accomplished and realized through said grouped operation, and thus is chosen so as to provide the "best rate", least cost and best quality of service for the consumer. The memory contains time of day information to aid in "best rate' and least cost selection. The choice for use of TAC, sequence of numbers and data and the dialed telephone number are then transmitted over the telephone line. The consumer's call is automatically connected to the called destination, via the telecommunications company or available paths as determined by the 'best rate" and least cost memory. The 'best rate: and least cost selection and call connection processes are automatic, transparent and outside the ability for choice to and by the consumer.

In stand-by mode, the off-hook detector 16 continuously monitors the incoming line, to determine if a call is being made. In the case in which a call is initiated by the telephone, fax, or modem 19, the central processing unit (CPU) 1, activates the Line Interrupter Switch (LIS) 12 to direct the dialing tones through the buffer 11 to the DTMF decoder 4. The dial tone generator 17 provides the dial tones, normally produced by the phone line 20, to the caller on line 19. The DTMF decoder 4 deciphers the DTMF dialing tones into a sequence of numbers represented by those tones and relays this information to the CPU 1. As an example, consider the initiation of a long distance call which utilizes the number one (1), then a three (3) digit area code and a seven (7) digit individual number, or in the event of an international telephone number the number zero (0) followed by sequence which may differ slightly from that described herein. When the CPU 1 determines that only a local call is being initiated, the CPU 1 will proceed to replicate the same number by sending a signal to the DTMF generator 5. The DTMF generator recreates the dialing number tones which are sent through buffer 10. The LIS 13 is closed to allow transmission of the tones through RJ-11 phone jack 14 which connects the BRTF to an external phone line 20 where the phone connection is made. Simultaneously, the LIS 12 is switched to connect the telephone, fax or modem 19 to the external line 20 for completion of the call.

However, if the number one (1) or zero (0) and following numbers in the dialing sequence are detected, the numbers are deciphered and stored in memory. The first numbers are noted as the area and city code or international country and city code, or data of the number being dialed. The CPU 1, then queries the clock module 6 for the current local time and date. Using the area code and time information, the CPU 1 generates a search code which it uses to search random access memory (RAM) 2 for a matching, choice for use of access codes, sequences of numbers or other data for accomplishment of the completion of the consumer dialed call at the best rate available for the completion of the call. It is noted here that since RAM chips are modular, space is left to accommodate expansion 3 of the memory. This would be desirable should it be necessary to store additional data. Upon finding a match to the search code, the associated chosen TAC, sequence of numbers and data is retrieved. The CPU 1 then takes the choice of TAC, sequences of numbers and data and appends it with the digits of the dialed calling number. This number is then sent to the DTMF generator 5 where an entire sequence of DTMF are generated for transmittal through buffer 10 to LIS 13 and if required, data tones are generated by the DRD modem 7 when signaled by CPU 1 for transmittal through buffer 9 to LIS 13. The CPU I causes the LIS 13 to direct the tone sequence through the output modular phone jack 14 which connects the BRTF to the external telephone line 20. When the tone sequences are sent to the external line 20 as required for completion, the LIS 12 is switched to complete the connection of the dialing device 19 to the external telephone line 20. When the device's choice for use of TAC, sequences of numbers and data is detected by the local telecommunications carrier, the call is routed to the carrier or path connection chosen by the BRTF. In standby mode when the device detects an incoming call from external line 20 through jack 14, LIS 13 through buffer 9 and DRD modem 7 allows CPU I to determine the incoming call as being a phone call or a fax/modem call and then CPU 1 directs or switches the incoming call through LIS 12 to modular jack 15 or fax/modem modular jack 22 allowing the incoming call to be received by the telephone or fax/modem device 19 on modular jack 15 or fax/modem jack 22.

Figure 3:
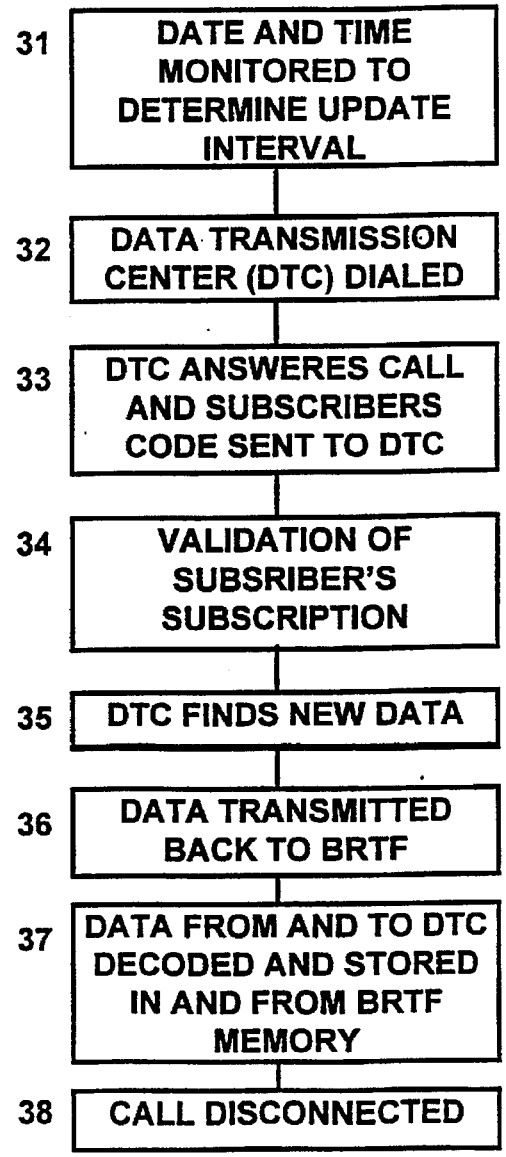
FIG. 3 is a flow diagram which illustrates the function of the automatic dialing of the DTC for unattended data communications.

In addition to the above mode of operation, the BRTF also operates in a second mode. Referring to FIG. 3 this second mode provides for the automatic updating of the facilitation abilities of the BRTF in obtaining TACs, sequences of numbers, related data, in conjunction with modem data transmission instructions and attendant search codes, as well as, the next Updating Time Interval (UTI) for the individually encoded BRTF used by the subscriber. The UTI is the time period during which the Data Transmission Center 21 (DTC) comprised of a telephone line tranceiving modem 23 and a computer 24 operation terminal connected to modem 23. Said DTC composite operation with modem 23 and computer 24, herein after shall be referred to in composite form operation as the DTC 21 has allocated time to accept incoming calls from specific BRTF users to allow for updating the unit. In this mode, the CPU 1 continuously monitors the clock 6 until the beginning of the UTI has arrived. At the moment, or as soon as the BRTF is idle (no incoming or outgoing calls are in progress as detected by the BRTF), the CPU 1 initiates the automatic updating sequence. The CPU 1 opens LIS 13 and then retrieves from the random access memory 2 the phone number and choice for use of TAG, sequences of numbers and data to accomplish connection with the DTC 21. The CPU 1 then transmits that number sequence to the DTMF generator 5 which generates the standard DTMF calling tones which are sent through buffer 10 and if required, data tones are generated by the DRD modem 7 when signaled by CPU 1 for transmittal through buffer 9, to LIS 13, and modular jack 14 to external telephone line 20. When the call is completed to the DTC 21, the DTC 21 will verify the subscriber's subscription, look up the new TACs, sequences of numbers and data determined to be appropriate and advantageous to the specific subscriber and transmit a data signal back to the BRTF. The CPU 1 instructs the LIS 13 to direct the signal through buffer 9 to the Data Receiver Decoder DRD Modem 7. The DRD Modem 7 decodes and interprets the incoming or outgoing data stream into or from a form which the CPU 1 can then tore and transmit in or from the RAM 2. Once the modem data has been stored and transmitted to and from RAM 2, the CPU 1 sends a signal back to the DTC 21 acknowledging that successful and verified updating and transmitting of data to and from the BRTF has been completed. The CPU 1 then terminates the call, closes LIS 12, and sets the BRTF into stand-by mode.

It should be noted that the BRTF also contains a battery 8 such as a standard nickel cadmium cell battery. The battery 8 provides for retention of memory in case of a power outage and a capacitor 18 also provides for a brief (3–15 minutes) retention of memory in the event that the BRTF is disconnected from telephone line power supply during replacement of the battery 8. The buffers 9, 10 and 11 provide isolation of the lower voltage CPU 1 and other associated circuitry from the higher voltage telephone line.

Having shown and described one embodiment of the invention, those skilled in the art will realize that variations and modifications can be made to produce the described invention and still be within the spirit and scope of the claimed invention. It is to be understood that the present invention is not limited to the sole embodiment described above, but encompasses any and all embodiments within the scope of the following claims.

We claim:

1. A device for automatically dialing one or more of a selected grouping of numbers in conjunction with determined data transmission to facilitate user subscribership interconnected grouped discount least cost routing call completion preceding a caller's dialed number, said caller's dialed number being input from an external telephone dialing device, to accomplish completion of a call to said dialed number, said device comprising:

a first electronic memory for storing said selected grouping of numbers, each said selected grouping of numbers being operationally related to pre-selected routing criteria which are linked with said caller's dialed number;

means for searching said first electronic memory to obtain one or more of said selected grouping of numbers in conjunction with determined data transmission to facilitate user subscribership interconnected grouped discount least cost routing call completion in accordance with said pre-selected routing criteria;

means for arranging said obtained selected grouping of numbers in conjunction with determined data transmission to facilitate user subscribership interconnected grouped discount least cost routing call completion with the caller's dialed number, to provide a combined number in conjunction with determined data transmission to facilitate user determined data transmission to facilitate user subscribership interconnected grouped discount least cost routing call completion, said combined number corresponding to said obtained selected grouping of numbers and said caller's dialed number;

means for automatically dialing said combined number in conjunction with determined data transmission to facilitate user subscribership interconnected grouped discount least cost routing call completion wherein a cost advantage to the caller is obtained for the caller's selected destination the routing of a call being accomplished in satisfaction of said pre-selected routing criteria and being transparent to the caller so that no choices for intervention or extra effort on the part of the caller is required; and means for accessing a communications access means of a data transmission center (DTC), said DTC storing telecommunication access codes, sequences of numbers and data within a second electronic memory, to connect said device to said DTC for transferring said codes and data to said second memory, and from said second memory the communications access means to connect said device for transferring data back to the DTC based on the device'CPU operational programming as determined by the DTC for the capturing of data obtained from the device during the device's normal call facilitation operation.

2. The device for automatically dialing as claimed in claim 1, further comprising a clock which stores the date and time of day to provide a clock output signal and wherein said means for searching is further responsive to said clock output signal, whereby the pre-selected routing criteria for connection to said dialed number is obtained by referencing said clock and said first electronic memory and an accurate record of callers long distance call durations are stored in said first electronic memory for billing purposes.

3. The device for automatically dialing as claimed in claim 1, wherein said device can be incorporated integrally with said external telephone, a facsimile machine or modem dialing device.

4. The device for automatically dialing as claimed in claim 1, further comprising a clock which stores the date and time of day of all operations of the device, and means responsive to said stored date and time to access said DTC, wherein communication to and from said data transmission center is activated according to said clock.

5. The device for automatically dialing as claimed in claim 1, further comprised in that said device may be incorporated integrally with said external telephone dialing device.

6. The device for automatically dialing as claimed in claim 1, further comprising a communication link to a data transmission center (DTC), said data transmission center storing telecommunication access codes, sequences of numbers and data, and being capable of transmitting said telecommunication access codes, sequences of number and data, to said first electronic memory, and the memory transmitting user call activity back to the DTC.

7. The device for automatically dialing as claimed in claim 6, further comprising a second clock which stores the date and time of day, wherein communication to and from said data transmission center is activated based on data received from said clock.

8. An apparatus for automatically selecting a telecommunications routing in accordance with a pre-selected routing criteria from a plurality of available telecommunications routings between a calling station and a destination station, said apparatus comprising:

a calling station memory for storing a plurality of routing codes in conjunction with determined data transmission to facilitate user subscribership interconnected grouped discount least cost routing call completion, each routing code indicative of a different telecommunications routing;

means responsive to a number dialed at said calling station for providing a search signal, upon detection of a dialed number requiring a non-local termination;

means responsive to said search signal for searching said memory according to said dialed number to select one of said routing codes in conjunction with determined data transmission to facilitate user subscribership interconnected grouped discount least cost routing call completion indicative of a selected telecommunications routing for satisfying said pre-selected routing criteria;

means for arranging said selected routing code in conjunction with determined data transmission to facilitate user subscribership interconnected grouped discount least cost routing call completion with said dialed number to provide a composite number signal capable of providing dialed information in conjunction with determined data transmission to facilitate user subscribership interconnected grouped discount least cost routing call completion to enable said calling station to be connected to said destination station via said selected telecommunications routing;

clock means for providing an output signal indicative of the date and time;

means for inputting said output signal with said search signal to enable searching said memory according to both said clock output signal and said dialed number and maintaining said clock signal and dialed number call duration in said memory of the device;

calling station dialer means responsive to said clock output signal to access a communications access means of a data transmission center (DTC), which enables a calling station to connect to said DTC, at a selected time and date to enable the connection of said DTC to said calling station, said DTC including processing means for storing access codes indicative of carrier controlled links; and means coupled to said calling station memory to enable said DTC to transmit and receive data to be stored in and transferred from said memory during said connection.

9. The selection apparatus according to claim 8 further including automatic dialing means responsive to said composite number signal in conjunction with determined data transmission to facilitate user subscribership interconnected grouped discount least cost routing call completion for automatically dialing said composite number in conjunction with determined data transmission to facilitate user subscribership interconnected grouped discount least cost routing call completion in conjunction with said dialed number.

10. The selection apparatus according to claim 8, further comprising off hook detection means associated with a calling line of said calling station which operates to provide an output signal when said calling line goes off hook, and means to respond to said off hook output signal to monitor dialing on said calling line to provide said search signal upon detection of a dialed non-local destination and to transmit said dialing to the calling line when a dialed local destination station is detected.

11. The selection apparatus according to claim 10, further comprising a line interrupter switch coupled between a calling station input and a calling station output to enable dialing to be transmitted to said calling station output when a dialed local destination station is detected and to switch said dialing from said output when said a dialed non-local destination station is detected.

12. The system according to claim 8, further including automatic dialing means for providing a dialing and data modem sequence output according to said composite number to thereby cause the connection between said calling station and said destination station that requires specific and variable data sequencing for connection.

13. A device for automatically dialing a selected grouping of numbers in conjunction with determined data transmission to facilitate user subscribership interconnected grouped discount least cost routing call completion preceding a caller's dialed number, said caller's dialed number being input from an external telephone dialing device, to accomplish completion of caller's selected destination, said device comprising:

an electronic memory for receiving and storing said selected grouping of numbers in conjunction with determined data transmission to facilitate user subscribership interconnected grouped discount least cost routing call completion;

means for interrogating said electronic memory to obtain the device's choice of said selected grouping of numbers in conjunction with determined data transmission to facilitate user subscribership interconnected grouped discount least cost routing call completion;

means for automatically dialing the device's choice of said selected grouping of numbers in conjunction with determined data transmission to facilitate user subscribership interconnected grouped discount least cost routing call completion followed by said caller's dialed number, wherein a grouped subscriber cost advantage is obtained for the caller's selected destination and where a maintained paid subscribership is offered by and through the device in a manner that is transparent to the caller so that no intervention, thought for choice or extra effort on the part of the caller is required; and a first clock which stores the date and time of day and day of month, such that a grouped subscriber cost advantage is obtained for connection to said caller's selected destination by referencing said first clock and said electronic memory, and whereby call activity and duration is maintained in said memory for downloading.

14. The device for automatically dialing as claimed in claim 13, wherein said device may be incorporated integrally with said external telephone dialing device.

15. A telephone control circuit comprising:

a first connector jack for connecting to a local telephone, facsimile machine or modem;

a dial tone generator connected to the first jack for providing a dial tone to the local telephone, facsimile machine or modem through the first jack;

an off-hook detector connected to the first jack for detecting when the telephone, facsimile machine or modem is off hook;

a first line interrupter switch connected to the first jack;

a processor connected to the off-hook detector and to the first line interrupter switch for closing the first line interrupter switch when the off-hook detector detects an off-hook condition;

a first buffer connected to the first line interrupter switch for storing DTMF tones from the first line interrupter switch and the first jack;

a DTMF decoder connected to the first buffer and to the processor for providing data signals to the processor which are related to the DTMF tones;

a DTMF generator connected to the processor for generating DTMF tones in response to data from the processor;

a second buffer connected to the generator for delivering the DTMF tones to a transceiver telephone line;

a second line interrupter switch connected through the telephone line to the second buffer and the first line interrupter switch connected to the processor for control of the second line interrupter switch;

a second connector jack connected to the second line interrupter switch for connection to an external telephone line; and a random access memory connected to the processor for storing and transferring data.

16. The apparatus of claim 15, further comprising a data transmission center connected to the second jack through an external telephone line, a third buffer connected to the second line interrupter switch, and a data receiver and sender connected to the third buffer and connected to the processor for transmitting and receiving data from the data transmission center to the processor.

17. A method of connecting telephones, facsimile machines or modems to external telephone lines, comprising:

connecting a telephone, facsimile machine or modem to a first jack;

generating a dial tone and providing the dial tone to the first jack;

detecting an off-hook condition of the telephone, facsimile machine or modem connected to the first jack;

switching DTMF signals from the telephone, facsimile machine or computer modem through a first buffer to a DTMF decoder and providing data signals to or from a central processor;

controlling the closing of a second switch with the processor and connecting a telephone line to a second jack for connection to an external telephone line;

providing data signals to a DTMF generator and when required, data tones are generated by a data receiver decoder (DRD) modem and providing DTMF and data tone signals when required from the generator and DRD modem through a second buffer to a transceiver telephone line;

controlling the first switch from the processor and connecting the transceiver telephone line to the first jack; and communicating data of a standard or a non-standard protocol between the processor and a memory for connection of a called destination.

18. The method of claim 17, further comprising connecting a data transmission center through the external telephone line to the second jack and second switch through a buffer and a data receiver/sender to the processor, and storing the data from the receiver in the processor in the memory or uploading to captured data from a BRTF call facilitation stored in memory.

19. The method of claim 17, further comprising discriminating between a local call, a long distance call or incoming call with the processor, closing the first and second switches for direct connection of the incoming call when detected and replicating consumer dialed tone in the generator when a local out going call is discerned, selecting a choice of telecommunication access code, sequence of numbers and path connection data from the memory when a long distance call is discerned and closing the second switch, supplying the data related to the least cost routing access and telephone number to the DTMF generator and supplying tones from the generator or from the DRD modem through the second switch to the external line and then closing the first switch to connect the external line through the second jack.

20. The method of claim 17, further comprising dialing a call with a telephone, fax or modem connected to the first jack and decoding the dialed number in the DTMF decoder, noting the date and time of the dialed call with the processor and a clock and the memory attached to the processor, comparing an area code or exchange number of the dialed number and the date and time combination, and searching the memory for an appropriate selection of access code, sequence of numbers and data if determined by the memory to be a long distance call, locating one or more choices of access code, sequence of numbers and data and adding the selection of access code, sequence of numbers and data to data relating to the dialed number, and generating DTMF tones or data tones related to the device's choices of access code, sequence of numbers and data preceding and with the dialed number.

21. The method of claim 17, further comprising monitoring date and time from a clock connected to the processor and determining an update interval from the memory, transmitting data to the DTMF generator dialing a data transmission center (FDTC), upon connection with the DTC, sending the subscriber's identification code from the memory and processor through the DTMF generator and DRD modem, validating the subscriber's subscription with the DTC, finding new access codes and data for call path completion, and transmitting the access codes and data back through the second jack and second switch to the buffer and data receiver to the processor and memory, decoding and storing data to and from the DTC through the data receiver, with processor memory sending to the DTC a data record of operations facilitated by the BRTF with time duration, time of day and day of month held in and from said memory.

\* \* \* \* \*